(12) United States Patent
Meylan et al.

(10) Patent No.: US 8,208,516 B2
(45) Date of Patent: Jun. 26, 2012

(54) ENCODER INITIALIZATION AND COMMUNICATIONS

(75) Inventors: Arnaud Meylan, San Diego, CA (US); Mark Whitney, San Marcos, CA (US); Ranjith Jayaram, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1293 days.

(21) Appl. No.: 11/775,155

(22) Filed: Jul. 9, 2007

(65) Prior Publication Data

US 2008/0013619 A1 Jan. 17, 2008

Related U.S. Application Data

(60) Provisional application No. 60/830,769, filed on Jul. 14, 2006.

(51) Int. Cl.
*H04B 1/00* (2006.01)
*H04W 36/00* (2009.01)

(52) U.S. Cl. ........................ 375/219; 455/436

(58) Field of Classification Search ................ 375/224, 375/295, 377, 219; 370/331–332; 455/436–439, 455/442; 382/236
See application file for complete search history.

(56) References Cited

U.S. PATENT DOCUMENTS

| | | | | |
|---|---|---|---|---|
| 4,748,620 A * | 5/1988 | Adelmann et al. | ............ | 370/394 |
| 5,832,129 A | 11/1998 | Horiuchi | | |
| 6,567,015 B2 * | 5/2003 | Adkins et al. | .................... | 341/13 |
| 6,711,295 B2 * | 3/2004 | Nakayama et al. | ............ | 382/232 |
| 7,106,907 B2 * | 9/2006 | Lin et al. | ........................ | 382/236 |
| 7,149,228 B1 * | 12/2006 | Kirla | ............................. | 370/465 |
| 7,403,892 B2 * | 7/2008 | Sjoberg et al. | ................. | 704/201 |
| 7,573,843 B2 * | 8/2009 | Koss | ............................. | 370/328 |
| 2002/0099537 A1 | 7/2002 | Tolhuizen et al. | | |
| 2003/0012275 A1 * | 1/2003 | Boice et al. | ............. | 375/240.01 |
| 2003/0086597 A1 * | 5/2003 | Ohta et al. | .................... | 382/131 |
| 2003/0112879 A1 | 6/2003 | Antia et al. | | |

(Continued)

FOREIGN PATENT DOCUMENTS

GB      2330485      4/1999

(Continued)

OTHER PUBLICATIONS

Bisada, S. et al.: "A Software Radio Architecture for CDMA IS-95-based Dual Mode Mobile Terminals," Circuits and Systems, 2000. Proceedings of the 43rd IEEE Midwest Symposium on Aug. 8-11, 2000, Piscataway, NJ, USA, IEEE, vol. 3, Aug. 8, 2000, pp. 1286-1287, XP010557628, ISBN: 0-7803-6475-9.

(Continued)

*Primary Examiner* — Lawrence B Williams
(74) *Attorney, Agent, or Firm* — Peng Zhu; Abdollah Katbab

(57) ABSTRACT

The disclosure is directed to an apparatus and method for encoder initialization and communications. The apparatus may include a database and an encoder module. The database may be configured to receive a plurality of parameters to be used for operation of the encoder module. The database may be further configured to store the plurality of parameters and to provide the plurality of parameters to the encoder module. The encoder module includes an encoder configured to be initialized based on the plurality of parameters from the database. When invoked, the encoder may rely on the database to initialize rather than performing measurements on the current signal that is to be encoded. In one aspect, the apparatus may be an access terminal that can seamlessly switch between different domains, different networks, different base stations, and different access points.

30 Claims, 10 Drawing Sheets

U.S. PATENT DOCUMENTS

| | | | |
|---|---|---|---|
| 2003/0195006 A1* | 10/2003 | Choong et al. | 455/450 |
| 2003/0210695 A1* | 11/2003 | Henrion | 370/392 |
| 2004/0146211 A1* | 7/2004 | Knapp et al. | 382/236 |
| 2004/0266435 A1* | 12/2004 | de Jong et al. | 455/436 |
| 2005/0055203 A1* | 3/2005 | Makinen et al. | 704/229 |
| 2006/0002355 A1* | 1/2006 | Baek et al. | 370/338 |
| 2006/0171419 A1* | 8/2006 | Spindola et al. | 370/477 |
| 2006/0246911 A1* | 11/2006 | Petermann | 455/444 |
| 2007/0116254 A1* | 5/2007 | Looney et al. | 379/406.01 |
| 2007/0156395 A1* | 7/2007 | Ojala | 704/211 |
| 2007/0190950 A1* | 8/2007 | Madhavan et al. | 455/99 |
| 2007/0202910 A1* | 8/2007 | Brewer et al. | 455/521 |

FOREIGN PATENT DOCUMENTS

| | | |
|---|---|---|
| JP | 2002507335 A | 3/2002 |
| WO | 03050758 | 6/2003 |

OTHER PUBLICATIONS

Seskar, I. et al., "A Software Radio Architecture for Linear Multiuser Detection," IEEE Journal on Selected Areas in Communications, IEEE Service Center, Piscataway, US, vol. 17, No. 5, May 1999, XP011054964, ISSN: 0733-8716.

Erben, H. et al.; "Advanced Software Radio Architecture for 3rd Generation Mobile Systems," VTC '98, 48th IEEE Vehicular Technology Conference, Ottawa, Canada, May 18-21, 1998, IEEE Vehicular Technology Conference, New York, NY; IEEE, US, vol. 2, Conf. 48, May 18, 1998 pp. 825-829, XP000895015, ISBN: 0-7803-4321-2.

Ruiz, P. et al.; "Adaptive Multimedia Applications to Improve User-perceived QoS in Multihop Wireless Ad hoc Networks," Proceedings of the IEEE International Conference on Wireless Lans and Home Networks (ICWLHN 2002) [Online] Aug. 2002, pp. 673-684, XP002466712; URL:http://ants.dif.um.es/{pedrom/publications.html#2002 [retrieved on Jan. 26, 2008].

Mitola, J.: "The Software Radio Architecture," IEEE Communications Magazine, IEEE Service Center, New York, NY, US, vol. 33, No. 5, May 1, 1995, pp. 26-38, XP000518768, ISSN: 0163-6804.

Tuttlebee, W.H.W: "Software-Defined Radio: Facets of a Developing Technology," IEEE Personal Communications, IEEE Communications Society, US, vol. 6, No. 2, Apr. 1999, pp. 38-44, XP000823967, ISSN: 1070-9916.

Mitola, J.; "Software Radio Architecture: A Mathematical Perspective," IEEE Journal on Selected Areas in Communications, IEEE Service Center, Piscataway, NJ, US, vol. 17, No. 4, Apr. 1999, pp. 514-538, XP000824300, ISSN: 0733-8716.

Shore, J.: "Digital Signal Processing Handbook, Chapter 50: Software Tools for Speech Research and Development," 1999, CRC Press LLC, XP002466713.

Jelinek, M. et al.: "On the Architecture of the CDMA2000—Variable-rate Multimode Wideband (VMR-WB) Speech Coding Standard," Acoustics, Speech, and Signal Processing, 2004. Proceedings, (ICASSP '04). IEEE International Conference on Montreal, Quebec, Canada May 17-21, 2004, Piscataway, NJ, USA, IEEE, vol. 1, May 17, 2004, pp. 281-284, XP010717620, ISBN: 0-7803-8484-9.

Paksoy, E. et al.: "The Application of Programmable DSPs in Mobile Communications, Chapter 9: Speech Coding Standards in Mobile Communications" Apr. 18, 2002, John Wiley and Sons, XP002466714, ISBN: 0-470-84590-2.

International Search Report and Written Opinion—PCT/US2007/073379, International Searching Authority—European Patent Office, May 8, 2008.

Jelinek M et al: "Advances in Source-controlled variable bit rate wideband speech coding" Special Workshop in Maui (SWIM): Letctures by Masters in Speech Processing, Jan. 12, 2004, pp. 1-8, XP002272510.

Jongseo Sohn et al: "A voice activity detector employing soft decision based noise spectrum adaptation" Acoustics, Speech and Signal Processing, 1998. Proceedings of the 1998 IEEE International Conference on Seattle, WA, USA May 12-15, 1998, New York, NY, USA, IEEE, US, vol. 1, May 12, 1998, pp. 365-368, XP010279166, ISBN: 0-7803-4428-6.

Taiwan Search Report—TW096125769—TIPO—Apr. 18, 2011.

\* cited by examiner

ENCODER INITIALIZATION AND COMMUNICATIONS

CLAIM OF PRIORITY UNDER 35 U.S.C. §119

The present application for patent claims priority to Provisional Application No. 60/830,769 entitled "Vocoder Initialization During Voice Call Continuity" filed Jul. 14, 2006, and assigned to the assignee hereof and hereby expressly incorporated by reference herein.

BACKGROUND

1. Field

The present disclosure relates generally to telecommunications, and more particularly, to encoder initialization and communications.

2. Background

Electronic devices can support multiple communication protocols. For example, mobile devices have become multifunctional devices, frequently providing email, Internet access, as well as traditional cellular communication. Mobile devices can be equipped with wide area wireless connectivity, for example, utilizing the following technologies: third generation wireless or cellular technologies (3G), World Interoperability for Microwave Access (WiMAX), and other to-be-defined wireless wide area network (WWAN) technologies. Meanwhile, wireless local area network (WLAN) connectivity is being installed in mobile devices as well. Ultra-wideband (UWB) and/or Bluetooth-based Wireless Personal Area Network (WPAN) local connectivity may also be available in mobile devices.

3G technologies may be utilized by mobile devices such as a mobile phone to transfer voice data (such as a phone call) as well as non-voice data (such as downloading information, exchanging email and instant messaging).

A WPAN may be utilized by mobile devices such as a laptop computer to connect the laptop computer to a wireless mouse, wireless keyboard, and the like. In addition, the laptop computer may include an IEEE 802.11b or 802.11g device to allow the laptop computer to communicate with a WLAN. WLAN has become popular and, for example, is being set up in homes for both personal and business purposes. In addition, coffee shops, Internet cafes, libraries and public and private organizations utilize WLANs.

WWAN technologies are used for wide area coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

The number of networks and network types continues to increase rapidly due to demands for functionality associated with unique user demands and divergent protocols. Disparate networks and network types are laborious for a user to switch between the networks, and the user may experience an unacceptable amount of delay in switching.

SUMMARY

An aspect of an apparatus for encoder initialization and communications is disclosed. The apparatus includes a database and an encoder module. The database is configured to receive a plurality of parameters to be used for operation of the encoder module. The database is further configured to store the plurality of parameters and to provide the plurality of parameters to the encoder module. The encoder module includes an encoder configured to be initialized based on the plurality of parameters from the database.

An aspect of a method of encoder initialization and communications is disclosed. The method includes receiving a plurality of parameters by a database. The plurality of parameters is to be used for operation of an encoder. The method further includes storing the plurality of parameters in the database, providing the plurality of parameters from the database, and initializing the encoder based on the plurality of parameters from the database.

Another aspect of an apparatus for encoder initialization and communications is disclosed. The apparatus includes means for encoding a signal, means for receiving a plurality of parameters that is to be used for operation of the means for encoding, means for storing the plurality of parameters, means for providing the plurality of parameters from the means for storing, and means for initializing the means for encoding based on the plurality of parameters provided by the means for storing.

An aspect of a machine-readable medium is disclosed. The machine-readable medium includes instructions for receiving by a database a plurality of parameters that is to be used for operation of an encoder, storing the plurality of parameters in the database, and providing the plurality of parameters from the database to allow the encoder to be initialized based on the plurality of parameters from the database.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the scope of the present disclosure. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawings, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

Figure 1:
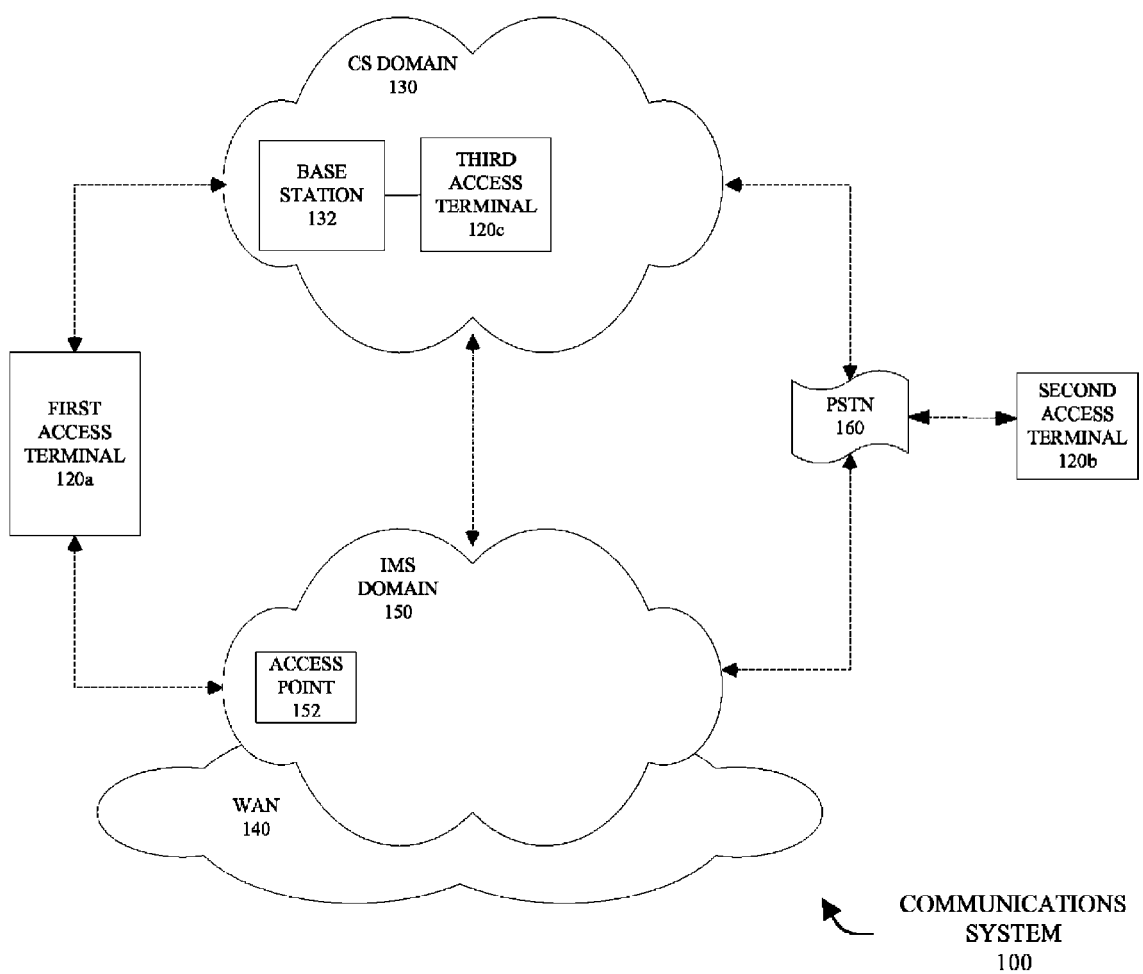
FIG. 1 is an exemplary block diagram of a configuration of a communications system according to one aspect of the disclosure.

FIG. 1 is an exemplary block diagram of a configuration of a communications system 100. The communications system 100 may include a first access terminal 120a, a second access terminal 120b, and a third access terminal 120c.

An access terminal may be any suitable communications device such as a wireless telephone, a wired telephone, a laptop computer, a desktop computer, a personal digital assistant (PDA), a data transceiver, a modem, a pager, a camera, a game console, an MPEG Audio Layer-3 (MP3) player, a transcoding device, a media gateway system, an audio communications device, a video communications device, a multimedia communications device, a health monitor, a component of any of the foregoing devices (e.g., a printed circuit board(s), an integrated circuit(s), or a circuit component(s)), any other suitable audio, video, or multimedia device, or a combination thereof. An access terminal may be referred to by those skilled in the art as a handset, wireless communications device, wireless telephone, cellular telephone, wired communications device, wired telephone, user terminal, user equipment, mobile station, mobile unit, subscriber unit, subscriber station, wireless station, mobile radio, radio telephone, or some other terminology. The various concepts described throughout this disclosure are intended to apply to all access terminals regardless of their specific nomenclature.

In FIG. 1, the first access terminal 120a may be a wireless telephone, the second access terminal 120b may be a wired telephone, and the third access terminal 120c may be a media gateway system according to one aspect. The communications system 100 may further include a circuit-switched (CS) domain 130, an Internet Protocol multimedia subsystem (IMS) domain 150, and a public switched telephone network (PSTN) 160. The IMS domain 150 may overlap with a wide area network (WAN) 140, such as the Internet.

The CS domain 130 may include a base station 132, and the IMS domain 150 may include an access point 152. The third access terminal 120c may be included in the CS domain 130. Each of the CS domain 130 and the IMS domain 150 may also include other well known components for transmitting, receiving and processing signals, but they are not shown to avoid obscuring the concepts described herein. The access terminal 120b may be connected to the PSTN 160 or a cable modem (not shown) and coupled to the CS domain 130, the IMS domain 150, and the WAN 140.

A CS domain may be, for example, a cellular domain. A CS domain may support a cellular communications network such as second-generation wireless or cellular technologies (2G), third-generation wireless or cellular technologies (3G), fourth-generation wireless or cellular technologies (4G), cellular code division multiple access (CDMA), wideband code division multiple access (W-CDMA), time division multiple access (TDMA), frequency division multiple access (FDMA), orthogonal frequency division multiple access (OFDMA), CDMA 2000 EV-DO, CDMA 2000 1XRTT, Global System for Mobile Communications (GSM), Ultra Mobile Broadband (UMB), or any other suitable cellular technologies. A CS domain 130 may also support a wired communications network in conjunction with a cellular communications network.

An IMS domain may support a wireless communications network such as a wide area network (WAN), a wireless local area network (WLAN), World Interoperability for Microwave Access (WiMAX), wireless fidelity (Wi-Fi), Institute for Electrical and Electronic Engineers (IEEE) 802.11, Bluetooth-based Wireless Personal Area Network (WPAN), ultra-wideband (UWB), Long Term Evolution (LTE), home radio frequency (HomeRF), or any other suitable wireless communications network. An IMS domain 150 may also support a wired communications network (e.g., a wired local area network (LAN)) in conjunction with a wireless communications network.

The first access terminal 120a may communicate with the second access terminal 120b using the CS domain 130 or the IMS domain 150. When the first access terminal 120a uses the CS domain 130, the first access terminal 120a may utilize the base station 132, which allows the first access terminal 120a to communicate with devices within the CS domain 130 and devices connected to the CS domain 130 (e.g., the second access terminal 120b). When the first access terminal 120a uses the IMS domain 150, it may utilize the access point 152, which allows the first access terminal 120a to communicate with devices within the IMS domain 150 and devices connected to the IMS domain 150 (e.g., the second access terminal 120b). While the communications system 100 has been illustrated with one CS domain and one IMS domain, the communication system 100 may include multiple CS domains, multiple IMS domains, multiple base stations, multiple access points, multiple PSTNs and/or additional access terminals.

Figure 2:
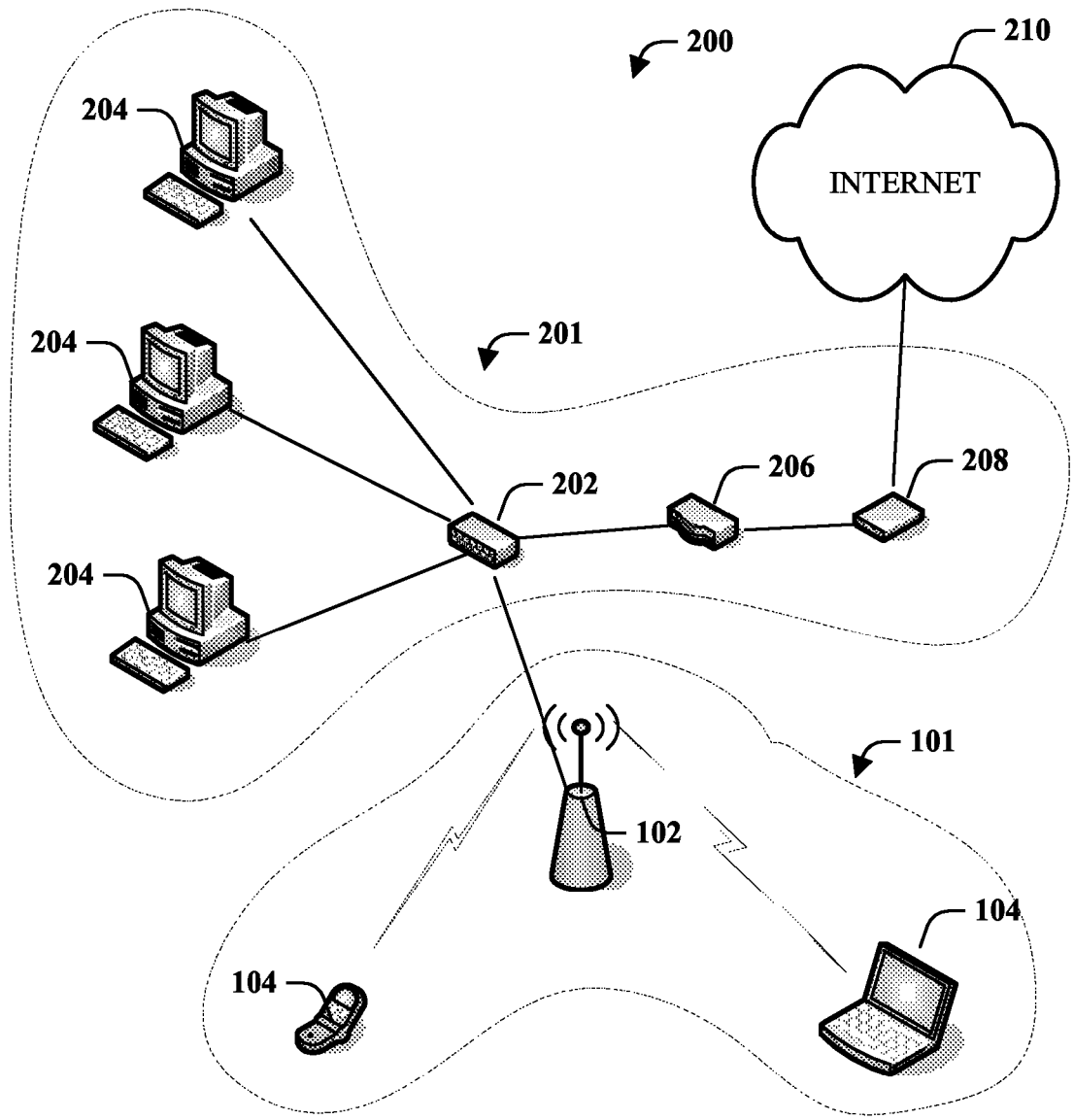
FIG. 2 illustrates an exemplary block diagram of a configuration of a communications system according to another aspect of the disclosure.

FIG. 2 illustrates an exemplary block diagram of a configuration of a communications system 200, which uses an IMS domain that supports wireless communications networks such as a WLAN 101 and a WAN 210 as well as a wired communications network such as a LAN 201. The WLAN 101 may include access terminals 104 and an access point 102. The WAN 210 may include the Internet. The LAN 201 may include electronic devices 204, an Ethernet hub 202, a router 206 and a modem 208.

The access point 102 can be in communication with the access terminals 104. The access point 102 is connected to the Ethernet hub 202 for the LAN 201. The Ethernet hub 202 may be connected to one or more electronic devices 204 that can include personal computers, peripheral devices (e.g., facsimile machines, copiers, printers, scanners, etc.), servers, and the like. The Ethernet hub 202 can be connected to the router 206 that transmits data packets to the modem 208. The modem 208 can transmit data packets to the WAN 210. The communications system 200 illustrates a simple network configuration. Many additional configurations of the communications system 200 including alternative electronic devices are possible. Although the communications system 200 has been illustrated and described with reference to the WLAN 101, the WAN 210 and the LAN 201, it is possible that the communications system 200 can utilize other technologies including, without limitation, any one or more of the communications networks supported by the CS domain 130 or the IMS domain 150, as described above, either separately or concurrently.

According to one aspect of the present disclosure, access terminals (e.g., 120a, 120b, 120c and 140 in FIGS. 1 and 2) can seamlessly switch between different domains, between different communications networks, between different access points, and between different base stations so that no substantial break in service is perceived by any of the parties involved in the communication. Such transfer from one domain to another domain, from one communications network to another communications network, from one access point to another access point, or from one base station to another base station can provide the users of the access terminals a sought-after-functionality and can be a function of the locations of the access terminals or the data the users desire to access or upload to the access terminals. Such a transition can be user initiated or performed autonomously by the communications system 100 or 200. Instead of being trapped in a network without regard to what might be the optimal network for the user at a given time, a configuration of the present disclosure can provide for seamless transitions between domains and networks for optimizing and converging on the suitable communication network and protocols for the user.

By way of example and not limitation, one or more of the access terminals 120a, 120b, 120c and 140 can be coupled to one or more of the electronic devices 204 or the LAN 201 to utilize a WAN, WWAN, and/or other networks available through the electronic devices 204 or the LAN 201.

Figure 3A:
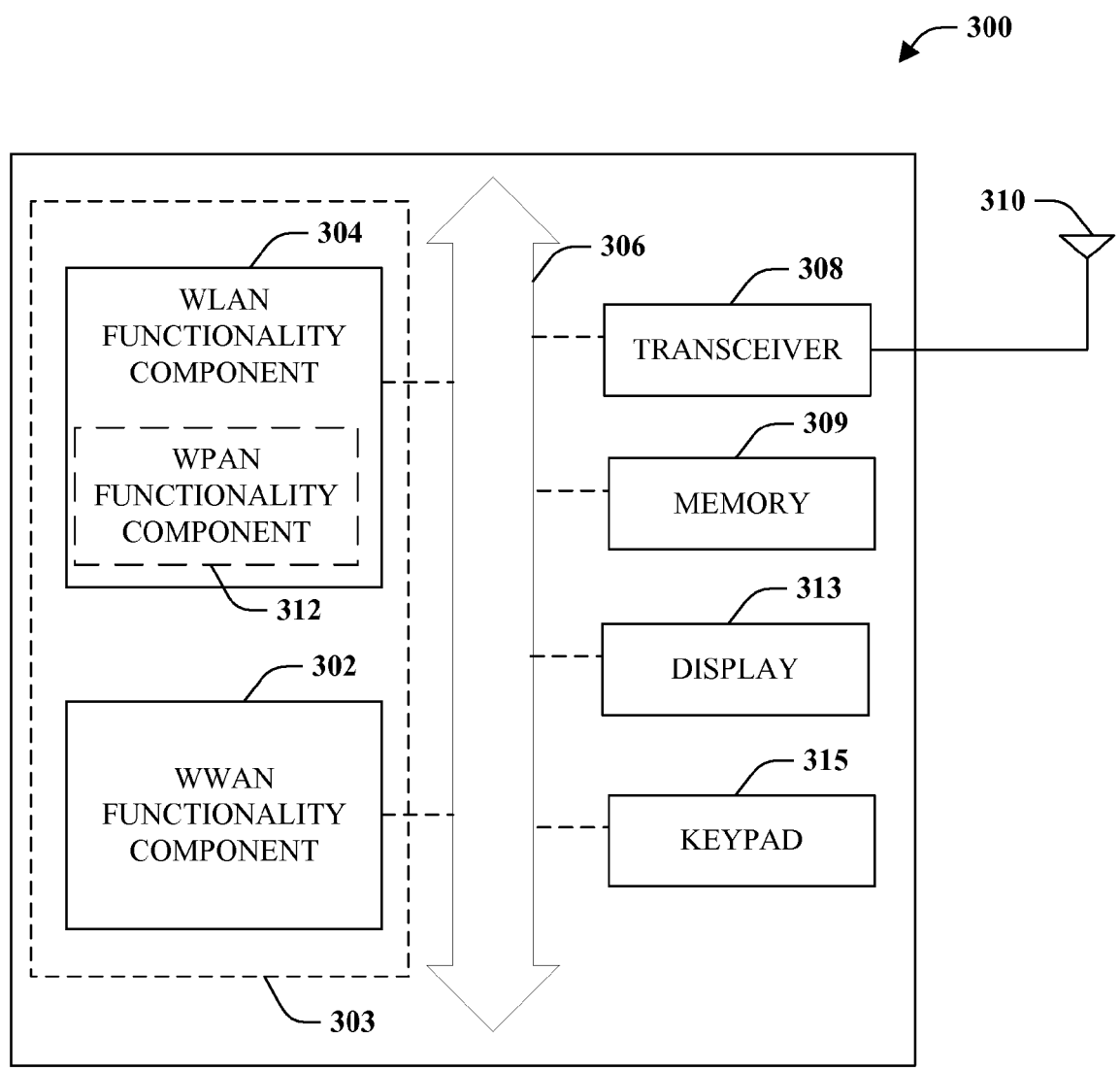
FIG. 3a is a simplified block diagram illustrating an example of an access terminal according to one aspect of the disclosure.

FIG. 3a is a simplified block diagram illustrating an example of an access terminal 300. The access terminal 300, when used as a mobile device, may include WWAN (e.g., CDMA, W-CDMA, or OFDMA), WLAN (e.g., IEEE 802.11) and/or other suitable cellular and/or wireless technologies (e.g., various cellular and/or wireless communication networks, as described above with reference to the CS domain 130 and the IMS domain 150).

In one aspect, a WWAN component 302 that provides WWAN functionality and a WLAN component 304 that provides WLAN functionality are located together and are capable of communication with a transceiver 308 through a bus 306 or other structures or devices. It should be understood that communication means other than busses could be utilized with the disclosed configurations. The transceiver 308 is coupled to one or more antennas 310 to allow transmission and/or reception by the access terminal 300. The WLAN component 304 can generate audio, voice and/or multimedia data to be provided to the transceiver 308 for communication.

In one aspect, the WWAN component 302 and/or the WLAN component 304 can be included in a processor 303 of the access terminal 300. In another aspect, WWAN functionality and WLAN functionality can be provided by distinct integrated circuits. In yet another aspect, WWAN functionality and WLAN functionality can be provided by one or more integrated circuits, processors, ASICs, FPGAs, combinations thereof, or the like including functionality. The access terminal 300 is equipped with connectivity options for the wide area (WWAN) and local area (WLAN) to allow a rich combination of services and user experiences.

The WLAN functionality component 304 can include an optional WPAN functionally component 312. The access terminal 300 can connect to any one or more of the WWAN, WLAN or WPAN, separately or simultaneously, based upon one or more criteria that relate to, for example, functions of the access terminal and the communication channel conditions (e.g., encoder type, data rate, channel conditions). Furthermore, the criteria for switching between different domains, between different communications networks, between different access points, and between different base stations may be stored, for example, in a memory 309 of the access terminal, and a processor (e.g., the processor 303) can analyze the communication and network based on the stored criteria.

The processor 303 may be implemented with a general purpose processor and volatile or non-volatile memory for storing data and instructions for software programs. The software programs, which may be stored in the memory 309, may be used by the general purpose processor to control and manage access to the various networks, as well as provide other communication and processing functions. The software programs may also provide an interface to the general purpose processor for various user interface devices, such as a display 313 and a keypad 315. The processor 303 may also include a digital signal processor (DSP) with an embedded software layer to offload various signal processing functions, such as convolutional encoding, modulation and spread-spectrum processing. The DSP may also perform encoder functions to support telephony applications. Alternatively, the processor 303 may be implemented with one or more application specific processors. The manner in which the processor 303 is implemented will depend on the particular application and the design constraints imposed on the overall system. Those skilled in the art will recognize the interchangeability of hardware, firmware, and software configurations under these circumstances, and how best to implement the described functionality for each particular application.

Figure 3B:
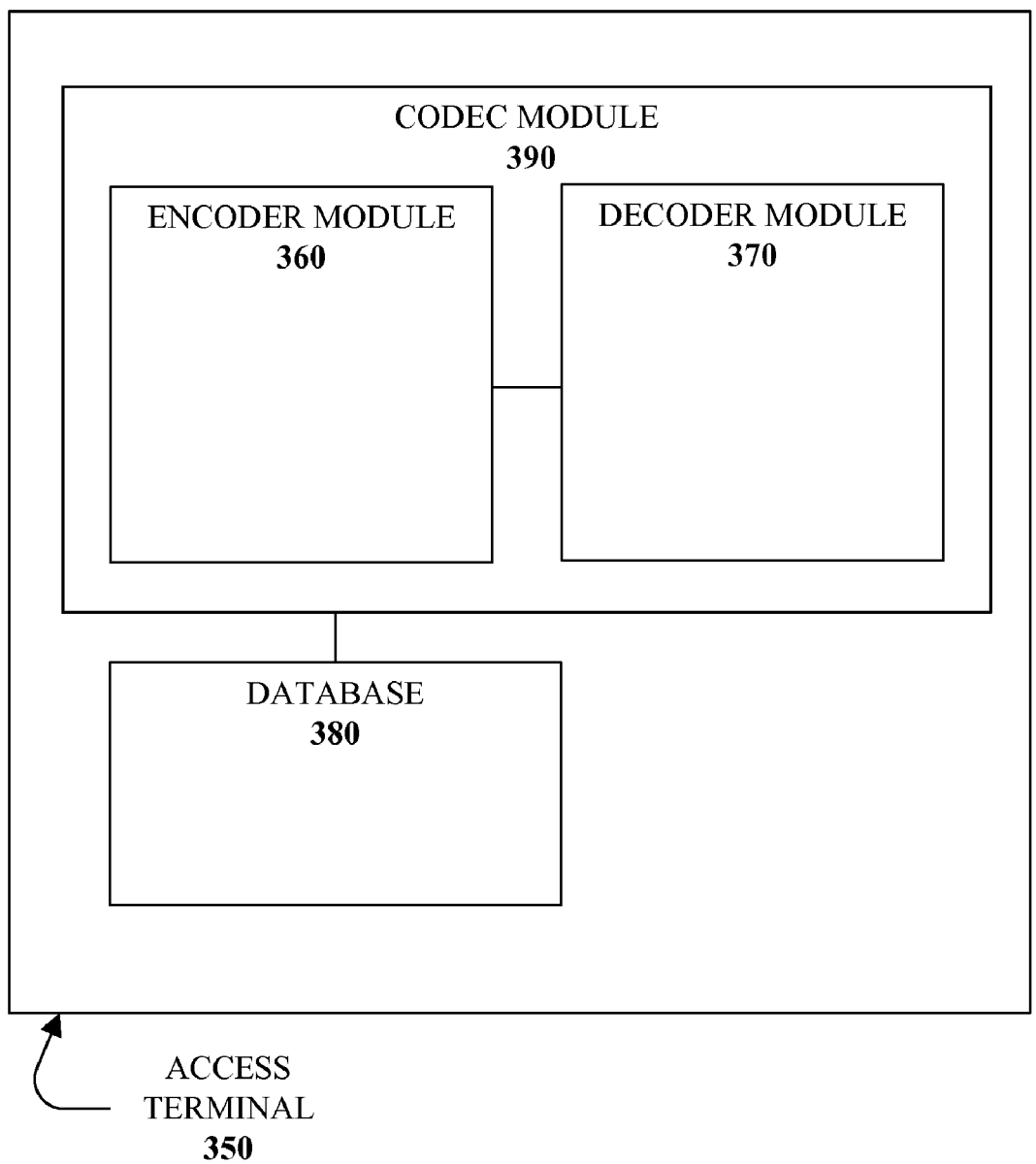
FIG. 3b is a simplified block diagram illustrating an another example of an access terminal according to one aspect of the disclosure.

FIG. 3b is a simplified block diagram illustrating an example of an access terminal 350. The access terminal 350 may include a codec module 390 and a database 380. In one aspect, the term codec may refer to encoder-decoder. For example, a codec may be used to encode and decode audio, video or any other media. A codec includes, for example, a vocoder. The term vocoder may be derived from voice encoder. The codec module 390 may include an encoder module 360 and a decoder module 370. The access terminal 350 may further include some or all of the components shown in FIG. 3a, or alternatively, the components shown in FIG. 3b may be incorporated into some of the components shown in FIG. 3a. For example, the codec module 390 of FIG. 3b may be incorporated into the processor 303 of FIG. 3a in one aspect. The database 380 of FIG. 3b may be incorporated into the memory 309 or the processor 303 of FIG. 3a. In another aspect, the codec module 390 and the database 380 of FIG. 3b may be implemented separately from the processor 303 and the memory 309 of FIG. 3a.

According to one aspect of the disclosure, an access terminal can be utilized as a Voice Over Internet Protocol (VoIP) phone. VoIP includes the transmission of voice telephone conversation through the Internet and/or through Internet Protocol (IP) networks such as an IMS domain network, and is provided, for example, via a WLAN component. VoIP can be utilized by an access terminal at home or when it is in vicinity of a wireless access point (WAP) connected to a broadband network that provides VoIP services. In other situations, an access terminal can work as a regular wireless mobile phone while providing communication services.

For a vocoder such as G.711, G.723, G.729, Enhanced Variable Rate Codec (EVRC), Selectable Mode Vocoder (SMV), Fourth Generation Vocoder™ (4GV™), Adaptive Multi-Rate (AMR), or Adaptive Multi-Rate-Wideband (AMR-WB), data packets may be generated every 10 ms or 20 ms. The transmission time of each data packet may depend on the wireless network conditions, for instance, the congestion seen in the network. A lag time may also be involved each time a transceiver is turned on or off.

In one aspect, Voice Call Continuity (VCC) may refer to procedures that allow a mobile subscriber to perform inter-technology handoff between VoIP sessions in IMS domain and voice calls in CS domain. It is desirable for VCC to provide seamless handoff for an ongoing voice sessions/calls across different domains.

According to one aspect, the present disclosure provides seamless VCC handoff between an IMS domain and a CS domain. Domain transfers may be enabled in one direction (e.g., from a CS domain to an IMS domain or from an IMS domain to a CS domain), or in both directions as per network configuration requirements. By way of example, and not by way of limitation, these handoffs may include:

Handoff from high rate packet data (HRPD) VoIP in IMS domain to CDMA 2000 1XRTT in CS domain;
Handoff from WLAN VoIP in IMS domain to CDMA 2000 1XRTT in CS domain;
Handoff from WLAN to GSM;
Handoff from WLAN to W-CDMA;
Handoff from Wi-Fi in IMS domain to 3G in CS domain; and
Any of the above handoff in reverse direction.

During VCC handoff, an access terminal (e.g., a wireless phone) may need to change the type of encoder (e.g., vocoder) used during the call due to, for instance, a change of underlying radio technology. Some vocoders like EVRC or AMR use the level of the background noise to select the rate to be used for encoding the audio. EVRC is an audio codec used in CDMA networks. AMR is an audio data compression scheme optimized for audio coding. AMR is adopted as the standard audio codec by the Third Generation Partnership Project (3GPP) standard. AMR uses techniques such as Algebraic Code Excited Linear Prediction (ACELP), Discontinuous Transmission (DTX), voice activity detection (VAD), and comfort noise generation (CNG). A change in the type of codec or the type of encoder may require initialization of the codec or encoder. Some codecs perform sub-optimally during their initialization phase while they adapt to the stream. When a codec can read optimal parameters (to be used for the media it is initialized for), optimal encoding can be achieved immediately.

During non-VCC calls, when there is at least one non-audio frame before an audio frame at the start of a call, there may be sufficient time during the call setup for the encoder (e.g., vocoder) to initialize. Under such circumstances, the Rate Determination Algorithm (RDA) of the EVRC encoder may measure the background noise to set the noise threshold in order to later perform the RDA for a given frame. In some implementations, the RDA background noise estimate is initialized to the maximum level. The estimate adapts upwards slowly, and downwards instantly (e.g., if the current audio frame energy is below the noise estimate, the estimate may be reduced to the current audio frame energy).

In some VCC cases (e.g., VCC cases using G.711, G.723, G.729 or EVRC), the above scenario may not work. In these cases, all of the audio frames are at about the same level, and thus appear as background noise.

For VCC applications, it is desirable to minimize the interruption of audio on both the uplink and the downlink. If there is audio activity at the time of switching from a state-less encoder to a smart encoder such as EVRC, the latter encoder's optimal operation may be delayed until the audio activity stops. That may result in longer than optimal audio artifacts.

In one aspect, the present disclosure may optimize encoder initialization during encoder switching as happens in VCC scenarios. A database external to an encoder may be utilized to store parameters that are required for encoder operation. When invoked, the encoder relies on the database to initialize, rather than performing measurements on the current audio frame that needs to be encoded, to minimize delay in encoding. The parameters in the database are updated based on a signal or signals received prior to the current audio frame. A prior signal may be a frame received directly prior to the current audio frame or a signal received at any time prior to the receipt of the current audio frame.

In one aspect, this disclosure presents a cross-encoder approach where all the parameters used by the encoder are made available in a database outside the encoder. When an encoder is initialized (e.g., when a new encoder is initialized, or the same encoder is re-initialized due to handoff), the encoder queries the database for the relevant parameters (e.g., background noise threshold). The parameters may include, for example, variables, threshold values, and/or criteria. The database may be, for example, a software module. Furthermore, when an encoder is able to successfully sample relevant parameters, it may feed the parameters back into the database and update the database to make the updated parameters available for future use by other encoder instances (e.g., encoder initializations).

The database may include, for example, one or more of the following information:
Band energy;
Background noise estimate;
Signal energy estimate;
Channel energy estimate vector;
Channel noise energy estimate vector;
Threshold used to determine the data rate as a function of the background noise and the quantized SNR in each frequency band;
Adaptive codebook index; and
Wireless channel information (e.g., channel conditions such as a channel packet loss rate, channel packet delay information, whether a feedback channel is available, a bit rate supported by the physical channel).

Figure 4:
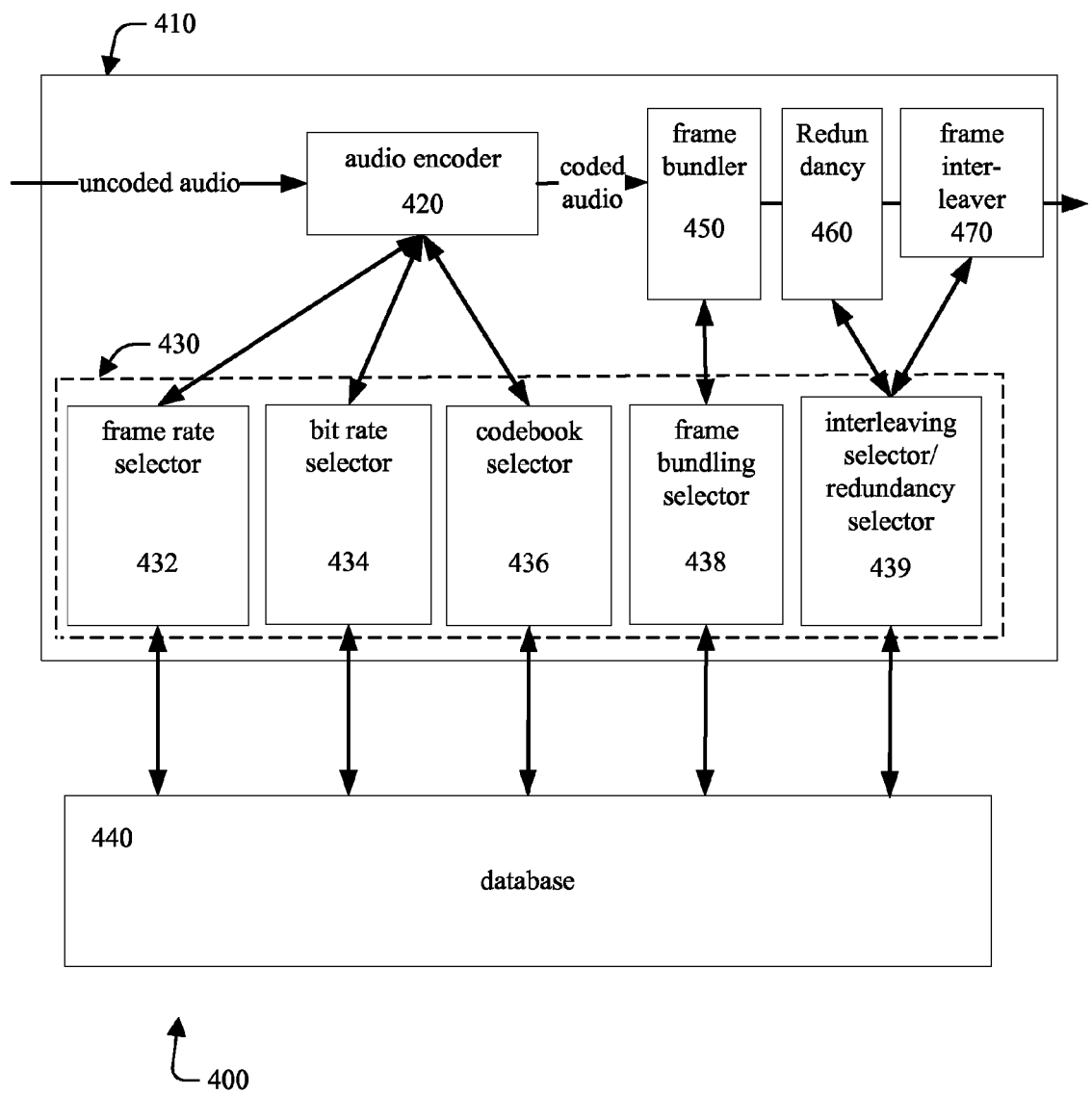
FIG. 4 is an exemplary block diagram of a configuration of an access terminal having an audio encoder according to one aspect of the disclosure.

FIG. 4 is an exemplary block diagram of a configuration of an access terminal 400. The access terminal 400 may include an audio encoder module 410 and a database 440. The audio encoder module 410 may include an audio encoder 420, a frame bundler 450, a redundancy module 460, a frame interleaver 470, and a selector 430. The selector 430 may include one or more of the following components: a frame rate selector 432, a bit rate selector 434, a codebook selector 436, a frame bundling selector 438, and an interleaving selector/redundancy selector 439. The database 440 can communicate bi-directionally with the audio encoder module 410, with the selector 430, or with any of the selector components (e.g., 432, 434, 436, 438, 439). The audio encoder 420 can communicate bi-directionally with the selector 430 or with one or more of the components of the selector 430 (e.g., 432, 434, 436). The frame bundler 450 can communicate bi-directionally with the frame bundling selector 438. The redundancy module 460 and the frame interleaver 470 can communicate bi-directionally with the interleaving selector/redundancy selector 489.

The frame rate selector 432 may be utilized, for example, when the audio encoder 420 uses EVRC. For instance, the frame rate selector 432 for EVRC may select an eighth (⅛) rate, a quarter (¼) rate, or a full rate. The bit rate selector 434 may be utilized, for example, when the audio encoder 420 uses AMR-WB. For example, the bit rate selector 434 for AMR-WB may select one of the following bit rates: 6.60, 8.85, 12.65, 14.25, 15.85, 18.25, 19.85, 23.05, and 23.85 kbits/sec.

The codebook selector 436 may select a codebook appropriate for the audio stream being received. The frame bundling selector 438 may determine whether coded frames need to be bundled. Bundled frames may reduce the overhead cost but may increase delay. The interleaving selector/redundancy selector 439 may determine whether frames need to be interleaved to mitigate packet loss on the communication channel and whether redundancy such as forward error correction (FEC) needs to be added to the audio stream.

According to one aspect of this disclosure, when an uncoded audio frame arrives at the audio encoder 420, a portion of the audio encoder 420 may process the uncoded audio frame and generate model parameters. If the model parameters are appropriate, then the audio encoder 420 may send the model parameters to the selector 430 or to one or more of the components of the selector 430 (e.g., 432, 434, 436). The database 440 then receives and stores the parameters from the selector 430 or its component(s).

In one aspect, the audio encoder 420 may be partitioned to include a plurality of encoders. For example, the audio encoder 420 may include two or more of the following encoders: G.711, G.723, G.729, EVRC, SMV, 4GV™, AMR, AMR-WB and the Skype audio encoder. In another aspect, the foregoing may be loaded onto the audio encoder 420 one at a time as needed.

The audio encoder 420 may need to be initialized, by way of example, and not by way of limitation, when any of the following events occurs: (i) when the access terminal 400 is handed off from one domain to another domain, (ii) when the access terminal 400 is handed off from a first network to a second network, where the data rate associated with the first network is different from the data rate associated with the second network, (iii) when the access terminal 400 is handed off from a first network to a second network, where the encoder type used by the first network is not supported by the second network, or (iv) when the data rate of the network associated with the access terminal 400 is changed.

A handoff from one domain to another domain may be, for example, a handoff from an IMS domain to a CS domain, a handoff from a CS domain to an IMS domain, or other domain transfers. A handoff from one network to another network may be, for example, a handoff from CDMA to GSM, a handoff from WLAN to WPAN, a handoff from a cellular communications network to a wireless local communications network, a handoff from a wireless local communications network to a wired communications network, a handoff from one base station to another base station (e.g., a base station that supports AMR to another base station that does not support AMR), a handoff from one WLAN access point to another access point, a handoff from a base station to an access point, any of the foregoing handoffs in reverse direction, or other network transfers. The data rate supported by the first network may be different from the data rate supported by the second network, for example, when a handoff occurs from one base station that is lightly loaded to another base station that is heavily loaded. The data rate of the network associated with an access terminal may need to be changed, for example, when the load on the network increases greatly. For example, if AMR is used as the encoder, then the rate of AMR may need to be changed (e.g., 12 kbits/sec to 9 kbits/sec) to avoid dropping calls.

One or more of the events described above may cause, by way of example, and not by way of limitation, one or more of the following to occur either automatically or otherwise: (i) selecting a new encoder type for use or (ii) re-initializing an encoder currently being used. This can cause the audio encoder 420 to be initialized automatically or otherwise. Furthermore, initiating a voice communication session or call (e.g., a VoIP session or a voice call) or powering-up the access terminal 400 can cause the audio encoder 420 to be initialized automatically or otherwise.

A new encoder type may be selected, for example, when a new encoder type among the plurality of encoders in the audio encoder 420 is selected for use (e.g., AMR is selected for use among G.711, G.723, and EVRC), or when a new encoder (e.g., EVRC) is loaded onto the audio encoder 420 for use. An encoder currently being used may need to be re-initialized, for example, when the access terminal 400 needs to change its data rate (e.g., the frame rate, bit rate, or the rate associated with the data or information being transmitted or received by the access terminal 400 needs to be changed).

In one aspect, when the audio encoder 420 needs to be initialized, the parameters stored in the database 440 is provided to the audio encoder module 410, to the selector 430, or to one or more components of the selector 430 (e.g., 432, 434, 436), which in turn provide the necessary parameters to the audio encoder 420. The audio encoder 420 thus relies on the database (which contains parameters generated based on prior communication signals) to initialize rather than performing measurements on current communication signals (e.g., current audio frame).

In another aspect, a frame or signal may be processed by a module (not shown) instead of the audio encoder 420, and the module may generate model parameters, which may be received and stored by the database 440, if appropriate.

Figure 5:
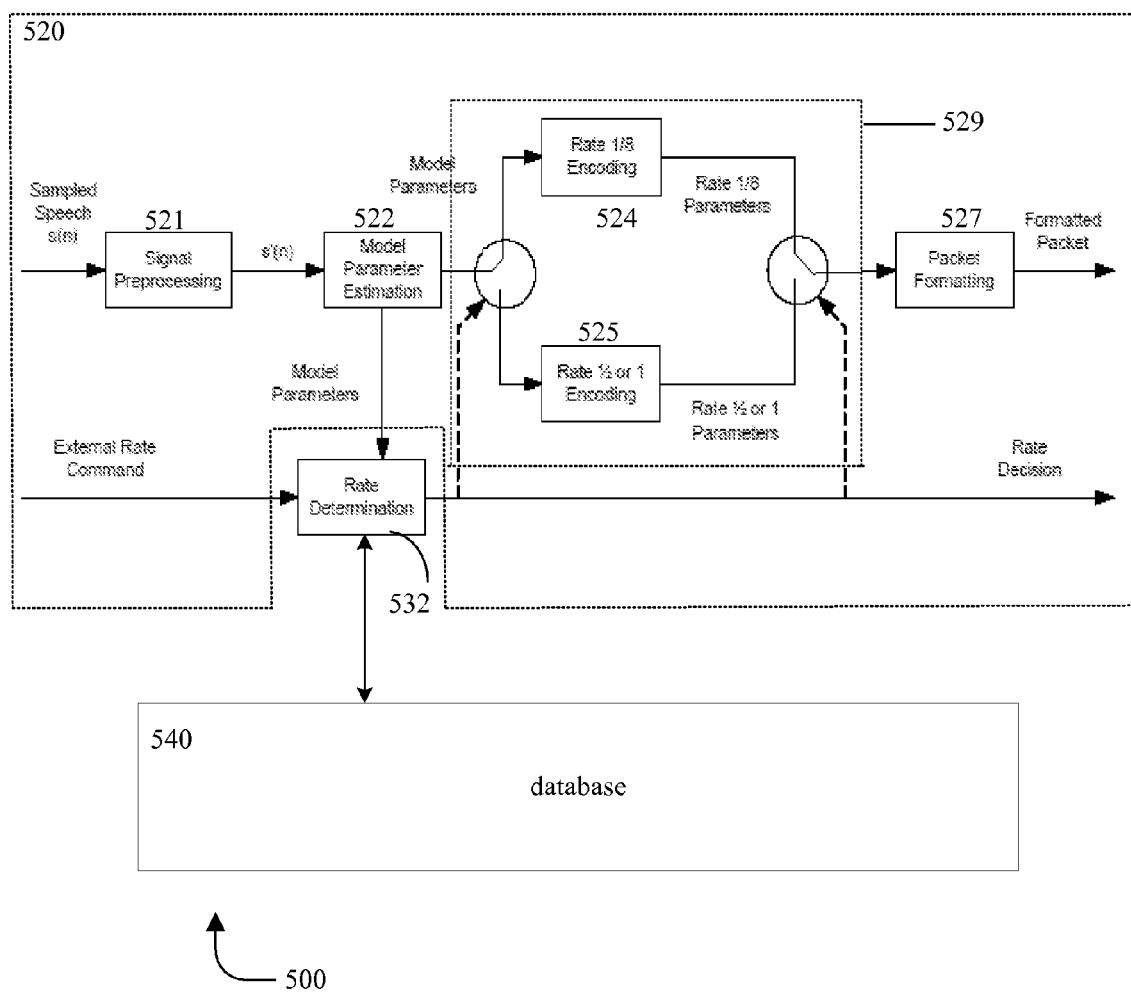
FIG. 5 is a simplified bock diagram illustrating an example of an access terminal having Enhanced Variable Rate Codec (EVRC) according to one aspect of the disclosure.

FIG. 5 is a simplified bock diagram illustrating an example of an access terminal 500 having EVRC as an encoder. The access terminal 500 includes an EVRC encoder 520, a selector such as a rate determination module 532, and a database 540. A signal preprocessing module 521 may receive a sampled speech signal s(n) (e.g., an audio frame), process the signal (e.g., to smooth the signal, avoid clipping and/or provide a signal that is within the range of the encoder), and generate a preprocessed signal s'(n). The preprocessed signal s'(n) is then provided to a model parameter estimation module 522, which may generate and provide model parameters to the rate determination module 532 and to an encoding block 529. If appropriate, the rate determination module 532 sends the model parameters to the database 540. The database 540 thus can receive and store the model parameters. If the encoder 520 needs to be initialized, it is initialized based on the model parameters stored and provided by the database 540 (such parameters generated based on the previously received signal) rather than processing and measuring a signal that is currently received by the signal preprocessing module 521. Initializing the encoder 520 using the model parameters, generated based on the previously received signal and stored by the database 540, minimizes the delay in encoding and provides seamless communication.

When the database 540 is empty, if the rate determination module 532 receives a first set of model parameters, the rate determination module 532 determines whether the first set of model parameters is appropriate. If the parameters are appropriate, then the rate determination module 532 may provide the parameters as threshold values to the database 540. Upon receiving a subsequent set of model parameters, the rate determination module 532 may compare the level of the subsequent set of model parameters to the threshold values in the database 540, determine the rate to be used for encoding based on the comparison, and provide the rate to the encoder 520. The rate determination module 532 may also provide the subsequent set of model parameters to the database 540 and update the database 540. The database 540 may be continuously updated in a similar manner.

The rate determination module 532 may determine whether a signal is a background noise by comparing the signal level to the threshold values in the database 540. If the signal is determined to be a noise, then it may be encoded at a quarter rate (e.g., using a rate ⅛ encoding block 524), and if the signal is determined to be an audio segment, it may be encoded at a half rate or full rate (e.g., using a rate ½ or 1 encoding block 525). A packet formatting block 527 may format the coded signal to the appropriate size to form a formatted packet. An external rate command may also be applied to the rate determination module 532 to force a rate and overwrite the values in the database 540.

Similar to the audio scenarios described above, several events may cause a video encoder to be initialized. A video encoder of an access terminal may need to be initialized, by way of example, and not by way of limitation, when any of the following events occurs: (i) when the access terminal is handed off from one domain to another domain, (ii) when the access terminal is handed off from a first network to a second network, where the data rate associated with the first network is different from the data rate associated with the second network, (iii) when the access terminal is handed off from a first network to a second network, where the encoder type used by the first network is not supported by the second network, or (iv) when the data rate of the network associated with the access terminal is changed.

For instance, if a call is started over an IMS domain such as a WLAN using an H.264 video encoder and is handed off to a CS domain such as CDMA 2000 1XRTT, the video encoder of the access terminal may need to be switched from H.264 to H.263 and initialized. In another example, a video encoder may need to be switched and initialized when an access terminal is handed off from a Third Generation Partnership Project (3GPP) network to a Third Generation Partnership Project 2 (3GPP2) network where the type of video encoder used by the first network (i.e., the 3GPP network) is not supported by the second network (i.e., the 3GPP2 network).

One or more of the events described above may cause, by way of example, and not by way of limitation, one or more of the following to occur either automatically or otherwise: (i) selecting a new encoder type for use or (ii) re-initializing an encoder currently being used. This may cause the video encoder to be initialized automatically or otherwise. In addition, initiating a video communication session or call can cause the video encoder to be initialized automatically or otherwise. For example, a video encoder can be initialized when a call that starts as a voice only call is switched to a video call or to a video and voice call. Furthermore, powering-up an access terminal can cause its video encoder to be initialized automatically or otherwise.

Similar to the audio scenarios described above, the video encoder initialization can benefit from having a central database storing information that helps the encoder operate optimally given the various conditions of the call. By loading that information from the database instead of having to learn it over time, the encoder is able to perform efficiently and provide seamless communication during the early portion of the video encoding (e.g., a few seconds to a minute after the initiation of the video call).

A database for a video encoder may store, for example, the following parameters:

Channel conditions including, for example, a channel packet loss rate and a channel packet loss pattern (e.g., how the packet loss is distributed—uniformly, in bursts, sparsely, or otherwise). This may have been collected by the database when the previous video encoder is used during the ongoing video call, and this is useful to the video encoder currently utilized. With that information, the current video encoder may choose, for instance, an appropriate rate for sending I frames.

Channel conditions including, for example, channel packet delay information, channel jitter and information regarding whether a feedback channel is available. Depending on the presence of a feedback channel, the video encoder may select one of many strategies for encoding. For instance, if feedback is available quickly, an aggressive coding approach can be used, given that any lost frame can be signaled and recovered.

Scene information. Encoding strategies depend on variability of the video scene encoded. For instance, for a video of a newscast, it may be appropriate to send I frames infrequently. However, for a video of a football game, it may be appropriate to send I frames frequently.

Bit rate supported by the physical channel. This may be used to set the quantization parameter.

Examples of video encoders include without limitation H.263, H.264, H.323, MPEG-1, MPEG-2, MPEG-4 and the Skype video encoder. An I frame may be a video frame that contains the full image, similar to a photograph. A P frame may be a video frame that encodes the difference between the current scene and the previous scene. For a given stream, a P frame is 4× to 10× smaller than an I frame. When either an I or P frame is lost, the quality of the image is poor until an I frame is received. Sending I frames frequently may be a good strategy over channels with a high packet error rate at the cost of reducing the definition at equal bit rate.

Figure 6:
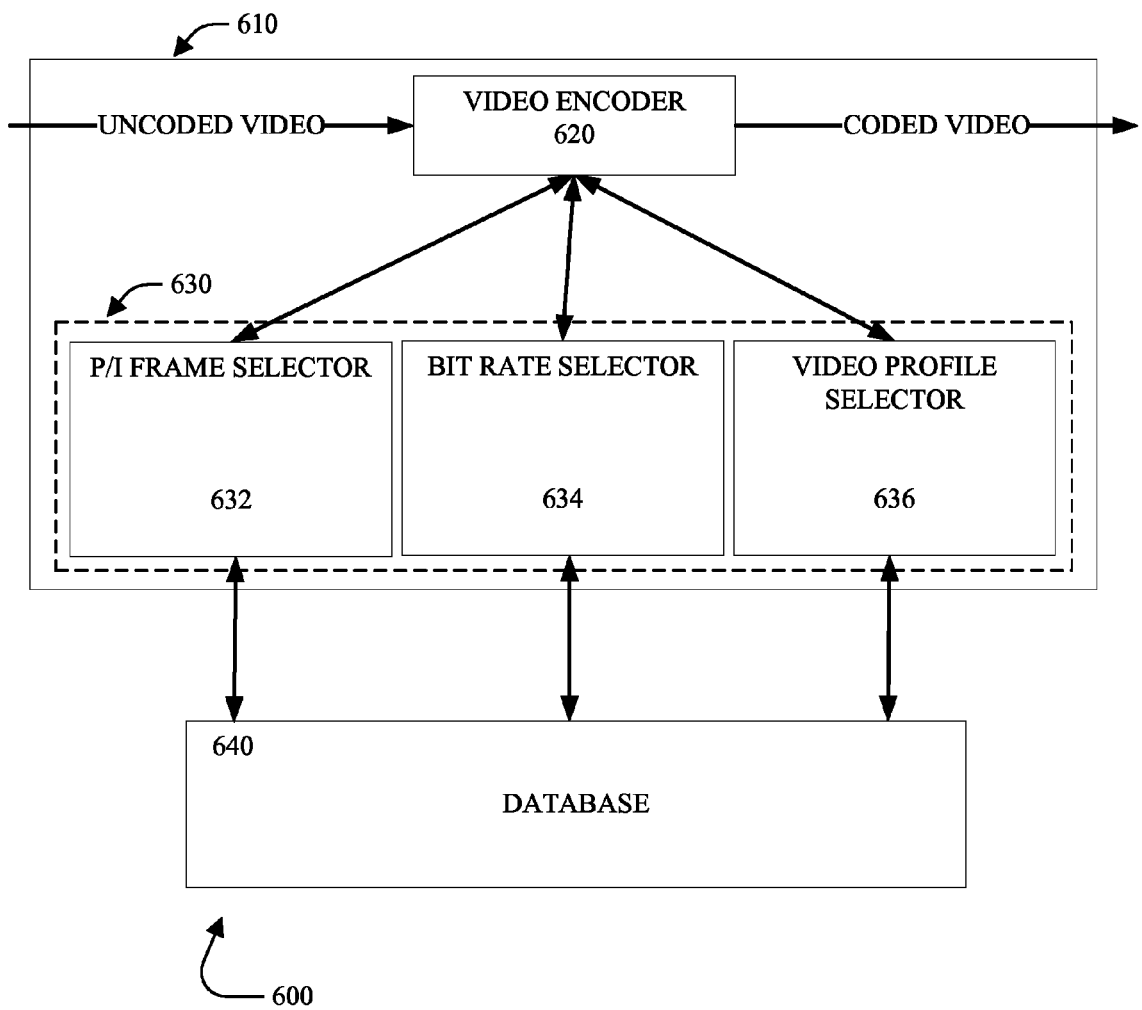
FIG. 6 is an exemplary block diagram of a configuration of an access terminal having a video encoder according to one aspect of the disclosure.

FIG. 6 is an exemplary block diagram of a configuration of an access terminal 600 having a video encoder. The disclosure provided above relating to an access terminal having an audio encoder applies similarly to the access terminal 600. The access terminal 600 may include a video encoder module 610 and a database 640. The video encoder module 610 may include a video encoder 620 and a selector 630, which may include one or more of the following components: a P/I frame selector 632, a bit rate selector 634, and a video profile selector 636. The P/I frame selector 632 may select a P frame or an I frame. The bit rate selector 634 may select the bit rate of the encoded video stream. The video profile selector 636 may include scene information. The database 640 can communicate bi-directionally with the video encoder module 610, the selector 630, or with any of the selector components (e.g., 632, 634, 636). The video encoder 620 can communicate bi-directionally with the selector 630 or with one or more of the components of the selector 630 (e.g., 632, 634, 636).

According to one aspect of this disclosure, when an uncoded video frame arrives at the video encoder 620, a portion of the video encoder 620 may process the uncoded video frame and generate model parameters. If the processed parameters are appropriate, then the video encoder 620 may send the model parameters to the selector 630 or to one or more of the components of the selector 630 (e.g., 632, 634, 636). The database 640 then receives and stores the parameters from the selector 630 or its component(s).

In one aspect, when the video encoder 620 needs to be initialized, the parameters stored in the database 640 may be provided to the video encoder module 610, to the selector 630, or to one or more components of the selector 630 (e.g., 632, 634, 636), which in turn provide the necessary parameters to the video encoder 620. The video encoder 620 thus relies on the database (which contains parameters generated based on prior communication signals) to initialize rather than performing measurements on current communication signals (e.g., current video frame).

In another aspect, a frame or signal may be processed by a module (not shown) instead of the video encoder 620, and the module may generate model parameters, which may be received and stored by the database 640, if appropriate.

In one aspect, the video encoder 620 may be partitioned to include a plurality of encoders. For example, the video encoder 620 may include two or more of the following encoders: H.263, H.264, H.323, MPEG-1, MPEG-2, MPEG-4 and the Skype video encoder. In another aspect, the foregoing may be loaded onto the video encoder 620 one at a time as needed.

The present disclosure is not limited to audio and video, and it can be applied to multimedia. In one aspect, multimedia can refer to a media that uses multiple forms of information content and information processing (e.g., two or more of text, audio, graphics, animation, video, file transfer, gaming, or interactivity).

Figure 7:
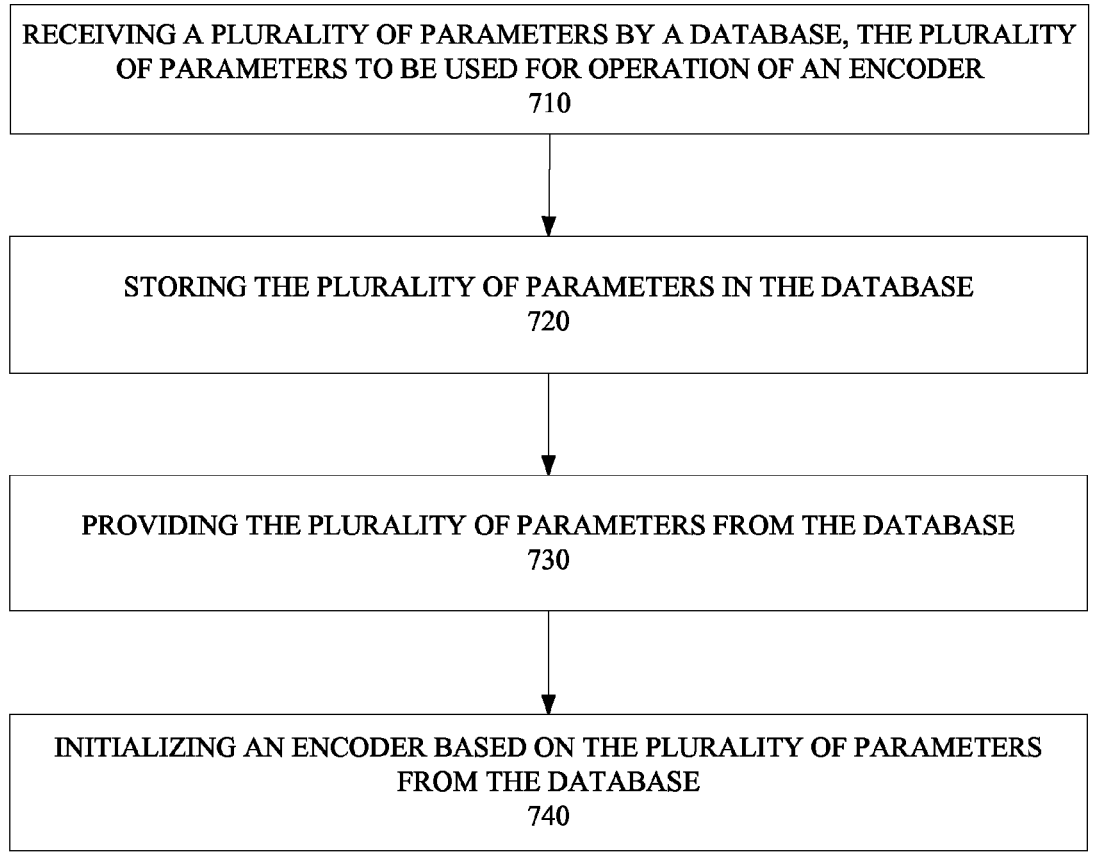
FIG. 7 is a flow chart illustrating an example of a process for encoder initialization and communications according to one aspect of the disclosure.

FIG. 7 is a flow chart illustrating an example of a process for encoder initialization and communications. In step 710, the database receives a plurality of parameters, which are to be used for operation of an encoder. In step 720, the database stores the plurality of parameters. In step 730, the plurality of parameters is provided from the database. In step 740, the encoder is initialized based on the plurality of parameters from the database. In another configuration, the plurality of parameters is not simply used for operation of the encoder, but rather is required for operation of the encoder. In yet another configuration, the encoder is initialized when invoked.

The process may further include one or more of the following steps according to one aspect of the disclosure. Before the database receives the plurality of parameters, a first communication signal is received. The plurality of parameters is generated based on the first communication signal. After receiving the first communication signal (a previous signal), a second communication signal (a current signal) is received. After initializing the encoder, the encoder encodes the current signal. The encoder is initialized based on the plurality of parameters associated with the previous signal and not the current signal that is encoded by the encoder. In one aspect, initialization of the encoder does not require performing measurements on the current signal. In another aspect, when the encoder encodes the current signal, it encodes the current signal only without encoding the previous signal at the same time.

In addition, the process may include one or more of the following steps according to another aspect. After a second plurality of parameters is generated based on the second communication signal, the database receives the second plurality of parameters, which are to be used for operation of the encoder. The database stores the second plurality of parameters. After receiving the second communication signal, a third communication signal (a new signal) is received. The second plurality of parameters is provided from the database so that the encoder is initialized based on the second plurality of parameters. The encoder encodes the third communication signal. The encoder is initialized based on the second plurality of parameters associated with the second communication signal and not the third communication signal (the new signal) that is encoded by the encoder. In one aspect, initialization of the encoder does not require performing measurements on the third communication signal. In another aspect, when the encoder encodes the third communication signal, it encodes the third communication signal only without encoding the second communication signal at the same time.

The process may further include one or more of the following according to yet another aspect. A selector may select the plurality of parameters from the database. The selector may then compare the selected plurality of parameters to a second plurality of parameters and determine one or more parameters based on the comparison. The selector may then provide the one or more parameters to the encoder for encoding and to the database to update the database.

Figure 8A:
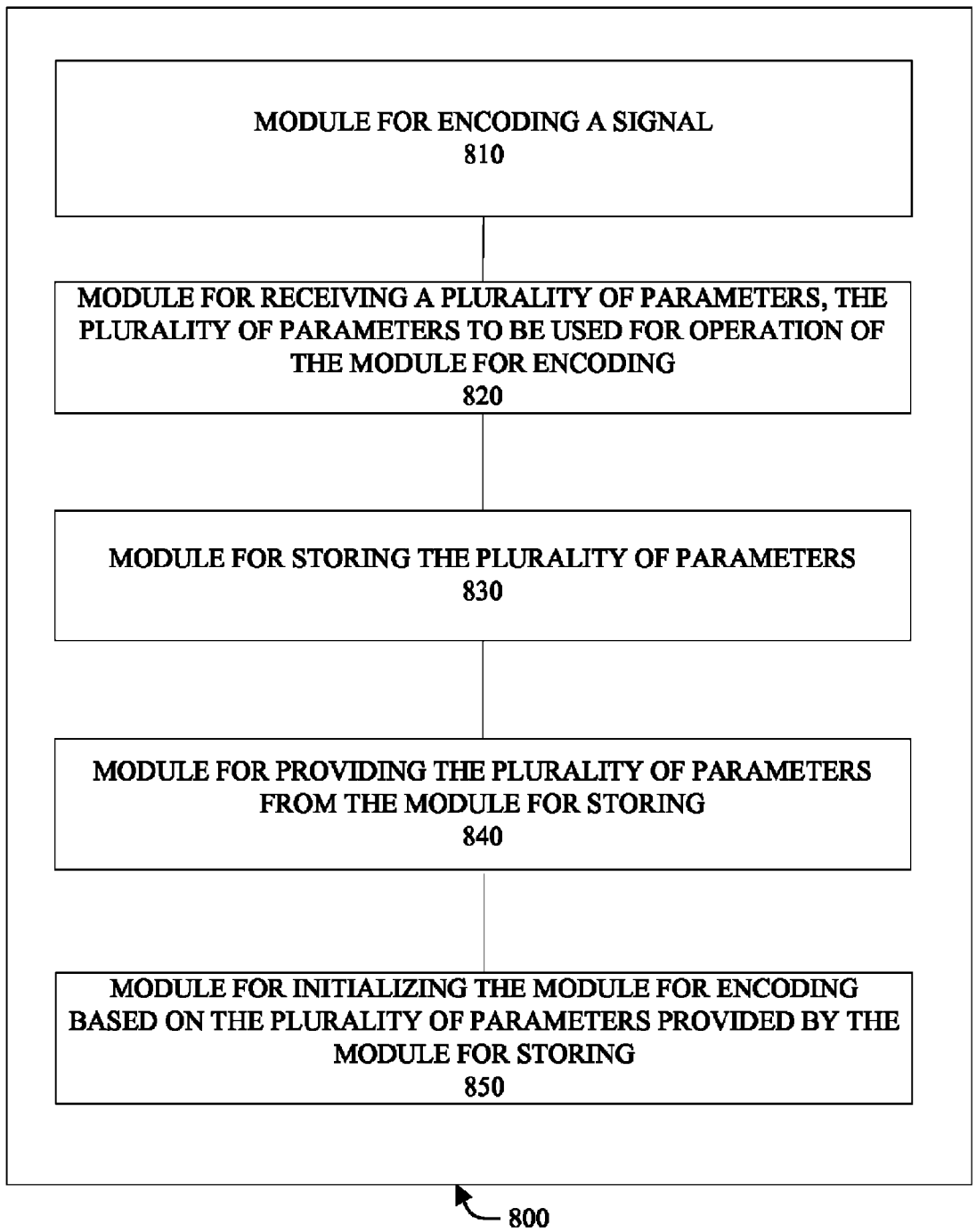
FIG. 8a is an exemplary functional block diagram of a configuration of an access terminal according to one aspect of the disclosure.

FIG. 8*a* is an exemplary functional block diagram of a configuration of an access terminal 800. The access terminal 800 for encoder initialization and communications includes a module 810 for encoding a signal and a module 820 for receiving a plurality of parameters, which is to be used for operation of the module 810. The access terminal 800 further includes a module 830 for storing the plurality of parameters, a module 840 for providing the plurality of parameters from the module 830, and a module 850 for initializing the module 810 based on the plurality of parameters provided by the module 830.

Figure 8B:
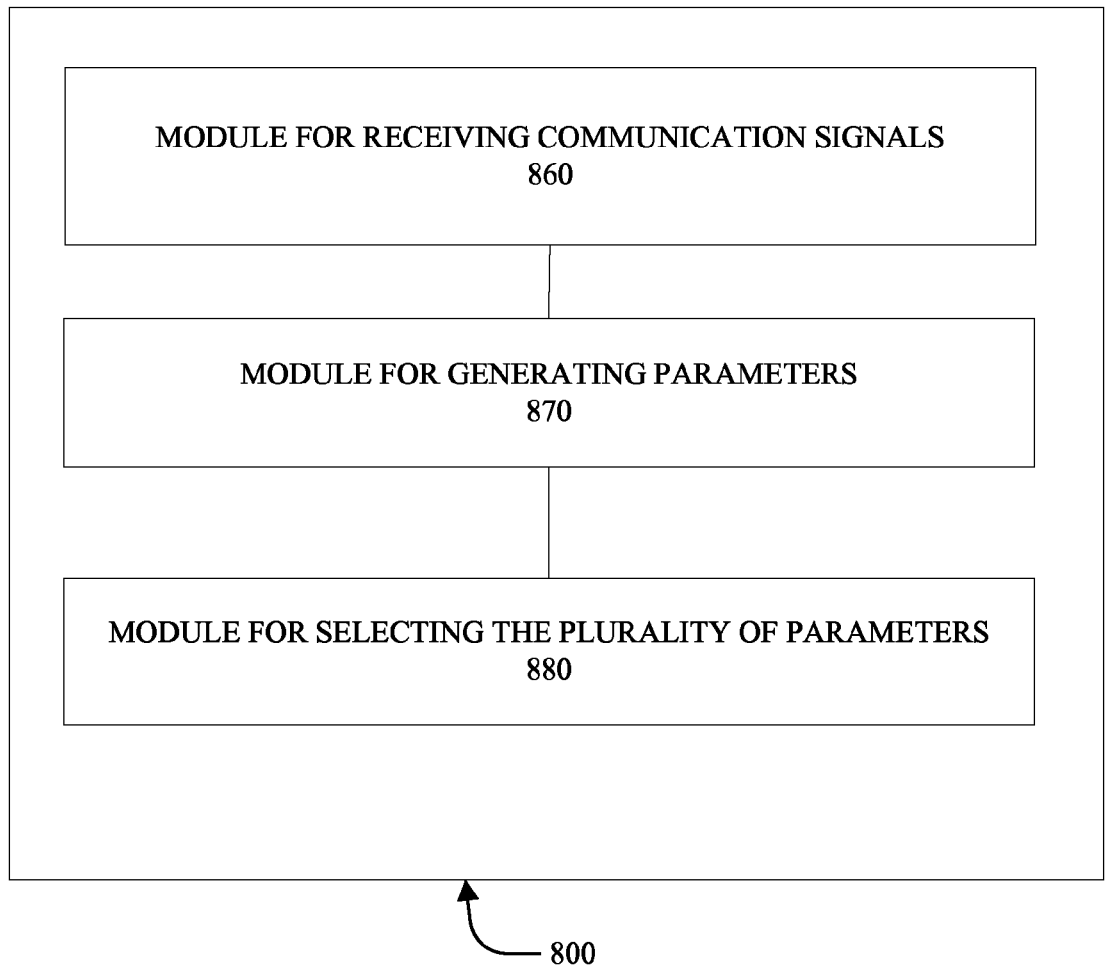
FIG. 8b illustrates additional exemplary features of the access terminal shown in FIG. 8a according to another aspect of the disclosure.

As illustrated in FIG. 8*b*, the access terminal 800 may further include a module 860 for receiving communication signals, a module 870 for generating parameters, and a module 880 for selecting the plurality of parameters. In one aspect, the module 860 is configured to receive a first communication signal (a previous signal) and to receive a second communication signal (a current signal) after receiving the first communication signal, and the module 870 is configured to generate the plurality of parameters based on the first communication signal. The module 810 is configured to encode the current signal without encoding the previous signal simultaneously, and the module 850 is configured to initialize the module 810 based on the plurality of parameters associated with the previous signal and not the current signal that is encoded by the module 810.

In one aspect, the module 880 for selecting the plurality of parameters includes the modules 820 and 840. In another aspect, the module 880 selects the plurality of parameters from the module 830, compares the selected plurality of parameters to a second plurality of parameters, determines one or more parameters based on the comparison, and provides the one or more parameters to the module 810 and to the module 830. The module 810 is configured to encode an audio signal, a video signal, or a multimedia signal.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, elements, components, methods, and algorithms described herein may be implemented as electronic hardware, computer software, or combinations of both. To illustrate this interchangeability of hardware and software, various illustrative logical blocks, modules, circuits, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, circuits, elements, and/or components described in connection with the configurations disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the configurations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. A computer-readable medium may be coupled to the processor such that the processor can read information from, and write information to, the computer-readable medium. In the alternative, the computer-readable medium may be integral to the processor. The processor and the computer-readable medium may reside in an ASIC. The ASIC may reside in a user terminal. In the alternative, the processor and the computer-readable medium may reside as discrete components in a user terminal.

The previous description is provided to enable any person skilled in the art to practice the various configurations described herein. Various modifications to these configurations will be readily apparent to those skilled in the art, and the generic principles defined herein may be applied to other configurations. Thus, the claims are not intended to be limited to the configurations shown herein, but is to be accorded the full scope consistent with the claims, wherein reference to an element in the singular is not intended to mean "one and only one" unless specifically so stated, but rather "one or more." The terms used herein such as "for example," "for instance," "example," "instance," "by way of example," "such as," and the like indicate an illustration by way of example, and not by way of limitation. While the claims refer to an encoder module and an encoder, these can be the same or different elements. All structural and functional equivalents to the elements of the various configurations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for encoder initialization and communications, comprising:
    an encoder module including an encoder; and
    a database configured to receive a plurality of parameters to be used for operation of the encoder module, the database further configured to store the plurality of parameters, the database further configured to provide the plurality of parameters to the encoder module,
    wherein the encoder is configured to be initialized based on the plurality of parameters from the database when at least one of the following occurs: when the apparatus is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed,
    wherein the handoff occurs seamlessly.

2. An apparatus for encoder initialization and communications, comprising:
    an encoder module including an encoder; and
    a database configured to receive a plurality of parameters to be used for operation of the encoder module, the database further configured to store the plurality of parameters, the database further configured to provide the plurality of parameters to the encoder module,
    wherein the encoder is configured to be initialized based on the plurality of parameters from the database when at least one of the following occurs: when the apparatus is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed,
    wherein each of the network supporting the first data rate, the network supporting the second data rate, the network using the encoder type, the network that does not support the encoder type, and the network associated with the apparatus is a communications network comprising at least one of an access point or a base station.

3. An apparatus for encoder initialization and communications, comprising:
    an encoder module including an encoder; and
    a database configured to receive a plurality of parameters to be used for operation of the encoder module, the database further configured to store the plurality of parameters, the database further configured to provide the plurality of parameters to the encoder module,
    wherein the encoder is configured to be initialized based on the plurality of parameters from the database when at least one of the following occurs: when the apparatus is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed, and
wherein if the first domain is an Internet Protocol multimedia subsystem (IMS) domain, then the second domain is a circuit-switched (CS) domain, and if the first domain is a CS domain, then the second domain is an IMS domain.

4. The apparatus of claim 3, wherein the IMS domain supports at least one of the following: a wide area network (WAN), a wireless local area network (WLAN), World Interoperability for Microwave Access (WiMAX), wireless fidelity (Wi-Fi), Institute for Electrical and Electronic Engineers (IEEE) 802.11, Bluetooth-based Wireless Personal Area Network (WPAN), ultra-wideband (UWB), Long Term Evolution (LTE) and home radio frequency (HomeRF), and
wherein the CS domain supports at least one of the following:
second-generation wireless or cellular technologies (2G), third-generation wireless or cellular technologies (3G), fourth-generation wireless or cellular technologies (4G), cellular code division multiple access (CDMA), wideband code division multiple access (W-CDMA), time division multiple access (TDMA), frequency division multiple access (FDMA), orthogonal frequency division multiple access (OFDMA), CDMA 2000 EV-DO, CDMA 2000 1XRTT, Global System for Mobile Communications (GSM), and Ultra Mobile Broadband (UMB).

5. An apparatus for encoder initialization and communications, comprising:
an encoder module including an encoder; and
a database configured to receive a plurality of parameters to be used for operation of the encoder module, the database further configured to store the plurality of parameters, the database further configured to provide the plurality of parameters to the encoder module,
wherein the encoder is configured to be initialized based on the plurality of parameters from the database when at least one of the following occurs: when the apparatus is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed,
wherein each of the network supporting the first data rate, the network supporting the second data rate, the network using the encoder type, and the network that does not support the encoder type comprises a base station.

6. An apparatus for encoder initialization and communications, comprising:
an encoder module including an encoder; and
a database configured to receive a plurality of parameters to be used for operation of the encoder module, the database further configured to store the plurality of parameters, the database further configured to provide the plurality of parameters to the encoder module,
wherein the encoder is configured to be initialized based on the plurality of parameters from the database when at least one of the following occurs: when the apparatus is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed,
wherein each of the network supporting the first data rate, the network supporting the second data rate, the network using the encoder type, and the network that does not support the encoder type comprises an access point.

7. A method of encoder initialization and communications, comprising:
receiving a plurality of parameters by a database, the plurality of parameters to be used for operation of an encoder;
storing the plurality of parameters in the database;
providing the plurality of parameters from the database;
initializing the encoder based on the plurality of parameters from the database;
receiving a first communication signal before the step of receiving a plurality of parameters;
generating the plurality of parameters based on the first communication signal;
receiving a second communication signal after the step of receiving the first communication signal, the second communication signal being a current signal, the first communication signal being a previous signal; and
encoding the current signal by the encoder after the step of initializing,
wherein the step of initializing comprises initializing the encoder based on the plurality of parameters associated with the previous signal and not the current signal that is encoded by the encoder.

8. The method of claim 7, further comprising:
generating a second plurality of parameters based on the second communication signal;
receiving the second plurality of parameters by the database, the second plurality of parameters to be used for operation of the encoder;
storing the second plurality of parameters in the database;
receiving a third communication signal after the step of receiving the second communication signal;
providing the second plurality of parameters from the database;
initializing the encoder based on the second plurality of parameters; and
encoding the third communication signal by the encoder,
wherein the step of initializing the encoder based on the second plurality of parameters comprises initializing the encoder based on the second plurality of parameters associated with the second communication signal and not the third communication signal that is encoded by the encoder, and wherein the step of encoding the third communication signal comprises encoding the third communication signal without encoding the second communication signal at the same time.

9. The method of claim 7, wherein the first communication signal is a first audio signal, and the second communication signal is a second audio signal.

10. The method of claim 7, wherein the first communication signal is a first video signal, and the second communication signal is a second video signal.

11. The method of claim 7, wherein the first communication signal is a first multimedia signal, and the second communication signal is a second multimedia signal.

12. A method of encoder initialization and communications, comprising:
receiving a plurality of parameters by a database, the plurality of parameters to be used for operation of an encoder;
storing the plurality of parameters in the database;

providing the plurality of parameters from the database;
initializing the encoder based on the plurality of parameters from the database;
selecting the plurality of parameters from the database;
comparing the selected plurality of parameters to a second plurality of parameters;
determining one or more parameters based on the comparison; and
providing the one or more parameters to the encoder and to the database.

13. The method of claim 7, wherein the encoder is an encoder of an access terminal.

14. The method of claim 7, wherein the plurality of parameters comprises one or more of the following: band energy, a background noise estimate, a signal energy estimate, a channel energy estimate vector, a channel noise energy estimate vector, a threshold to determine a data rate, an adaptive codebook index, and wireless channel information.

15. The method of claim 7, wherein the encoder is initialized when one of the following occurs: when a type of the encoder is changed, when a data rate of the encoder needs to be changed, when a communication session or call is initiated, or when the encoder is powered-up.

16. The method of claim 7, wherein the encoder is initialized when one of the following occurs: when an apparatus comprising the encoder is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed.

17. An apparatus for encoder initialization and communications, comprising:
means for encoding a signal;
means for receiving a plurality of parameters, the plurality of parameters to be used for operation of the means for encoding;
means for storing the plurality of parameters;
means for providing the plurality of parameters from the means for storing;
means for initializing the means for encoding based on the plurality of parameters provided by the means for storing;
means for receiving communication signals, wherein the means for receiving communication signals is configured to receive a first communication signal and to receive a second communication signal after receiving the first communication signal, the second communication signal being a current signal, the first communication signal being a previous signal; and
means for generating parameters, wherein the means for generating parameters is configured to generate the plurality of parameters based on the first communication signal,
wherein the means for encoding is configured to encode the current signal without encoding the previous signal simultaneously, and wherein the means for initializing is configured to initialize the means for encoding based on the plurality of parameters associated with the previous signal and not the current signal that is encoded by the means for encoding.

18. The apparatus of claim 17, further comprising means for selecting the plurality of parameters, wherein the means for selecting comprises the means for receiving the plurality of parameters and the means for providing the plurality of parameters.

19. The apparatus of claim 17, further comprising:
means for selecting the plurality of parameters from the means for storing;
means for comparing the selected plurality of parameters to a second plurality of parameters; means for determining one or more parameters based on the comparison; and
means for providing the one or more parameters to the means for encoding and to the means for storing.

20. The apparatus of claim 17, wherein the means for encoding is configured to encode an audio signal, a video signal, or a multimedia signal.

21. The apparatus of claim 17, wherein the apparatus is an access terminal.

22. The apparatus of claim 17, wherein the means for initializing is configured to initialize the means for encoding based on the plurality of parameters provided by the means for storing when one of the following occurs: when the apparatus changes an encoder type being used, when a data rate of the apparatus needs to be changed, when a communication session or call is initiated, or when the apparatus is powered-up.

23. The apparatus of claim 17, wherein the means for initializing is configured to initialize the means for encoding based on the plurality of parameters provided by the means for storing when one of the following occurs: when an apparatus comprising the encoder is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed.

24. A computer program product, comprising:
a non-transitory computer-readable medium comprising:
code for causing at least one computer to receive a plurality of parameters by a database, the plurality of parameters to be used for operation of an encoder;
code for causing the at least one computer to store the plurality of parameters in the database;
code for causing the at least one computer to provide the plurality of parameters from the database to allow the encoder to be initialized based on the plurality of parameters from the database;
code for causing the at least one computer to invoke initialization of the encoder, wherein the encoder is to be initialized based on the plurality of parameters from the database;
code for causing the at least one computer to generate the plurality of parameters based on a first communication signal; and
code for causing the at least one computer to invoke encoding of a second communication signal, the second communication signal being a current signal and the first communication signal being a previous signal,
wherein the encoder is to be initialized based on the plurality of parameters associated with the previous signal and not the current signal.

25. The computer program product of claim 24, wherein each of the first communication signal and the second communication signal is an audio signal, a video signal, or a multimedia signal.

26. The computer program product of claim 24, wherein the initialization of the encoder is invoked upon occurrence of one of the following events: when a type of the encoder is changed, when a data rate of the encoder needs to be changed, when a communication session or call is initiated, or when the encoder is powered-up.

27. The computer program product of claim 24, wherein the initialization of the encoder is invoked upon occurrence of one of the following events: when an apparatus comprising the encoder is handed off from a first domain to a second domain; when the apparatus is handed off from a network supporting a first data rate to a network supporting a second data rate, wherein the first data rate is different from the second data rate; when the apparatus is handed off from a network using an encoder type to a network that does not support the encoder type; or when a data rate of a network associated with the apparatus is changed.

28. The computer program product of claim 24, wherein the computer-readable medium further comprises code for causing the at least one computer to select or determine the plurality of parameters for the database.

29. A computer program product, comprising:
a non-transitory computer-readable medium comprising:

code for causing at least one computer to receive a plurality of parameters by a database, the plurality of parameters to be used for operation of an encoder;

code for causing the at least one computer to store the plurality of parameters in the database;

code for causing the at least one computer to provide the plurality of parameters from the database to allow the encoder to be initialized based on the plurality of parameters from the database;

code for causing the at least one computer to select the plurality of parameters from the database;

code for causing the at least one computer to compare the selected plurality of parameters to a second plurality of parameters;

code for causing the at least one computer to determine one or more parameters based on the comparison; and code for causing the at least one computer to provide the one or more parameters to the encoder and to the database.

30. The computer program product of claim 29, wherein the encoder is an encoder of an access terminal.

* * * * *